US011530001B2

(12) United States Patent
Williams et al.

(10) Patent No.: US 11,530,001 B2
(45) Date of Patent: Dec. 20, 2022

(54) EXPANDABLE LENGTH CARGO BED SYSTEM WITH MID-BED ACCESS

(71) Applicant: Toyota Motor Engineering & Manufacturing North America, Inc., Plano, TX (US)

(72) Inventors: Paxton S. Williams, Milan, MI (US); Colby Steven Williams, Milan, MI (US); Marjorie R. Williams, Ann Arbor, MI (US); Scott Louis Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 335 days.

(21) Appl. No.: 16/722,205

(22) Filed: Dec. 20, 2019

(65) Prior Publication Data

US 2021/0188368 A1  Jun. 24, 2021

(51) Int. Cl.
*B62D 33/027* (2006.01)
*B60P 3/40* (2006.01)
*B62D 33/08* (2006.01)
*B62D 21/14* (2006.01)
*B60R 21/00* (2006.01)

(52) U.S. Cl.
CPC .............. *B62D 33/027* (2013.01); *B60P 3/40* (2013.01); *B62D 21/14* (2013.01); *B62D 33/08* (2013.01); *B60R 2021/0083* (2013.01)

(58) Field of Classification Search
CPC .. B62D 33/027; B62D 33/0636; B62D 21/14; B62D 33/08; B60P 3/40; B60P 3/34
USPC ...... 296/26.03, 26.08, 26.09, 26.1, 171, 175
See application file for complete search history.

(56) References Cited

U.S. PATENT DOCUMENTS

| 3,740,088 A * | 6/1973 | Ratcliff | B60P 3/34 296/171 |
|---|---|---|---|
| 4,784,429 A * | 11/1988 | Hodges | B60J 7/041 296/26.05 |
| 5,000,502 A * | 3/1991 | Lyall | B60P 3/14 296/26.09 |
| 5,127,697 A * | 7/1992 | St. Marie | B62D 33/08 296/26.09 |
| 6,367,858 B1 | 4/2002 | Bradford | |
| 8,857,886 B2 | 10/2014 | Kimmet | |
| 2003/0141733 A1 | 7/2003 | Burg | |

\* cited by examiner

*Primary Examiner* — Stephen T Gordon
(74) *Attorney, Agent, or Firm* — Christopher G. Darrow; Darrow Mustafa PC

(57) ABSTRACT

An expandable cargo bed system for a vehicle includes a front shell having a front shell first sidewall. The front shell first sidewall includes at least one cargo bed access passage extending between a first side of the front shell first sidewall and a second side of the front shell first sidewall opposite the first side. A rear shell is operably coupled to the front shell so as to be movable with respect to the front shell between a retracted position and an extended position so as to vary a length of the cargo bed. The rear shell has a rear shell first sidewall. The rear shell first sidewall is structured to cover the at least one cargo bed access passage when the rear shell is in the retracted position. The rear shell first sidewall is also structured so that the at least one cargo bed access passage is exposed when the rear shell is in the extended position.

4 Claims, 5 Drawing Sheets

EXPANDABLE LENGTH CARGO BED SYSTEM WITH MID-BED ACCESS

TECHNICAL FIELD

The present invention relates to mechanisms enabling an increase in length of a vehicle cargo bed and, more particularly, to an expandable cargo bed system having a first, static portion and a second portion movable with respect to the first portion to increase the length of the cargo bed.

BACKGROUND

Users sometimes find it useful to be able to increase the length of a vehicle cargo bed, such as a pickup truck cargo bed. However, as the length of the cargo bed increases, access to portions of the cargo bed may become more difficult.

SUMMARY

In one aspect of the embodiments described herein, an expandable cargo bed system for a vehicle is provided. The system includes a front shell having a front shell first sidewall. The front shell first sidewall includes at least one cargo bed access passage extending between a first side of the front shell first sidewall and a second side of the front shell first sidewall opposite the first side. A rear shell is operably coupled to the front shell so as to be movable with respect to the front shell between a retracted position and an extended position so as to vary a length of the cargo bed. The rear shell has a rear shell first sidewall. The rear shell first sidewall is structured to cover the at least one cargo bed access passage when the rear shell is in the retracted position. The rear shell first sidewall is also structured so that the at least one cargo bed access passage is uncovered when the rear shell is in the extended position.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1A:
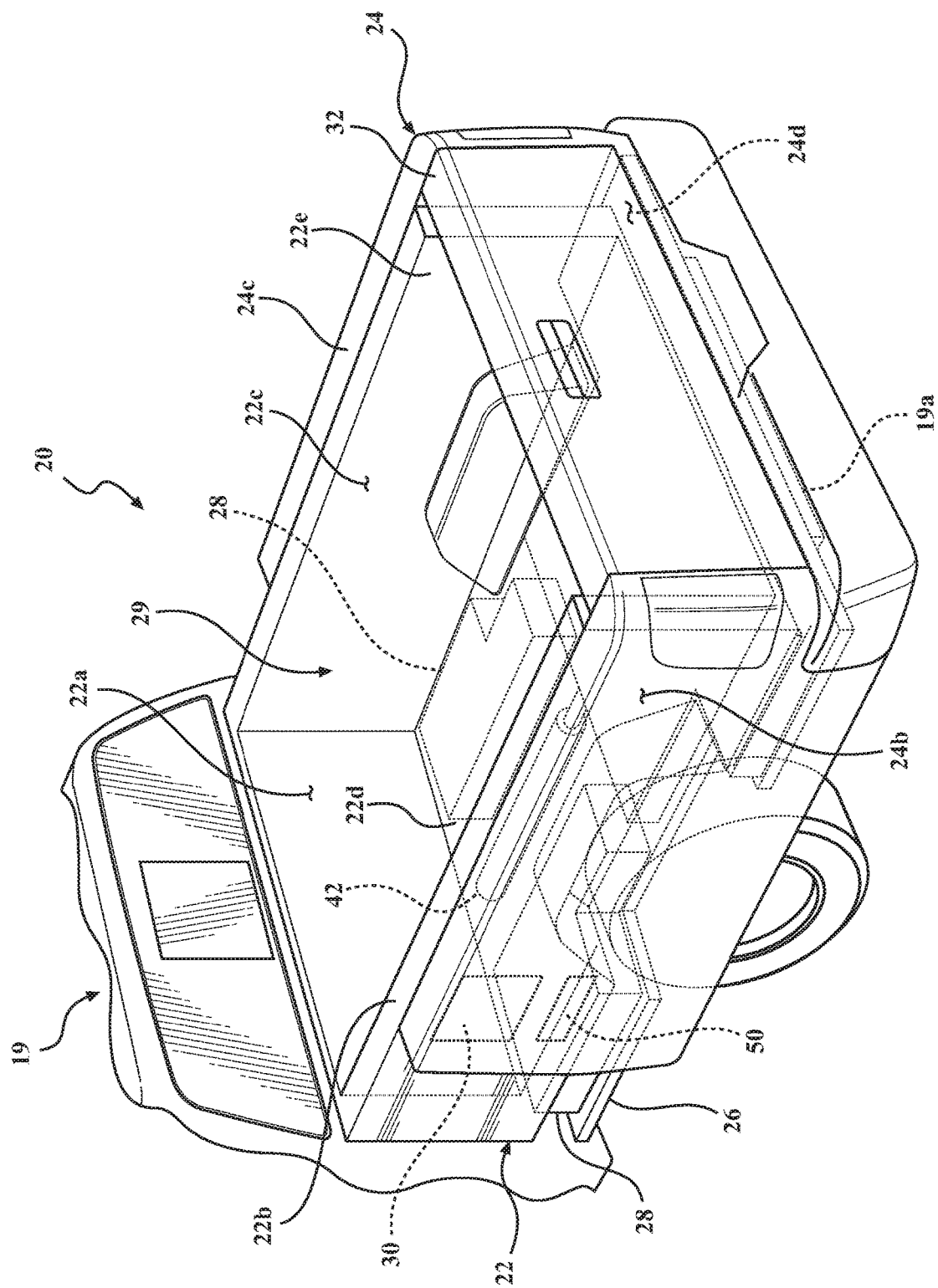
FIG. 1A is a schematic perspective view of a portion of a vehicle incorporating an expandable cargo bed system in accordance with an embodiment described herein, showing a rear shell of the system in a retracted position.

Embodiments described herein relate to an expandable cargo bed system for a vehicle is provided. The system includes a front shell having a front shell first sidewall. The front shell first sidewall includes at least one cargo bed access passage extending between a first side of the front shell first sidewall and a second side of the front shell first sidewall opposite the first side. A rear shell is operably coupled to the front shell so as to be movable with respect to the front shell between a retracted position and an extended position so as to vary a length of the cargo bed. The rear shell has a rear shell first sidewall. The rear shell first sidewall is structured to cover the at least one cargo bed access passage when the rear shell is in the retracted position. The rear shell first sidewall is also structured so that the at least one cargo bed access passage is uncovered or exposed when the rear shell is in the extended position. In one or more arrangements, the shell first sidewall may also include at least one first sidewall interior compartment. The rear shell first sidewall may be structured to cover an opening of the at least one first sidewall interior compartment when the rear shell is in the retracted position. The rear shell first sidewall may also be structured so that the at least one first sidewall interior compartment opening is uncovered or exposed when the rear shell is in the extended position.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments. Any of the components described herein may be formed from a material (or materials) suitable for the purpose(s) of the element as described herein.

Figure 1B:
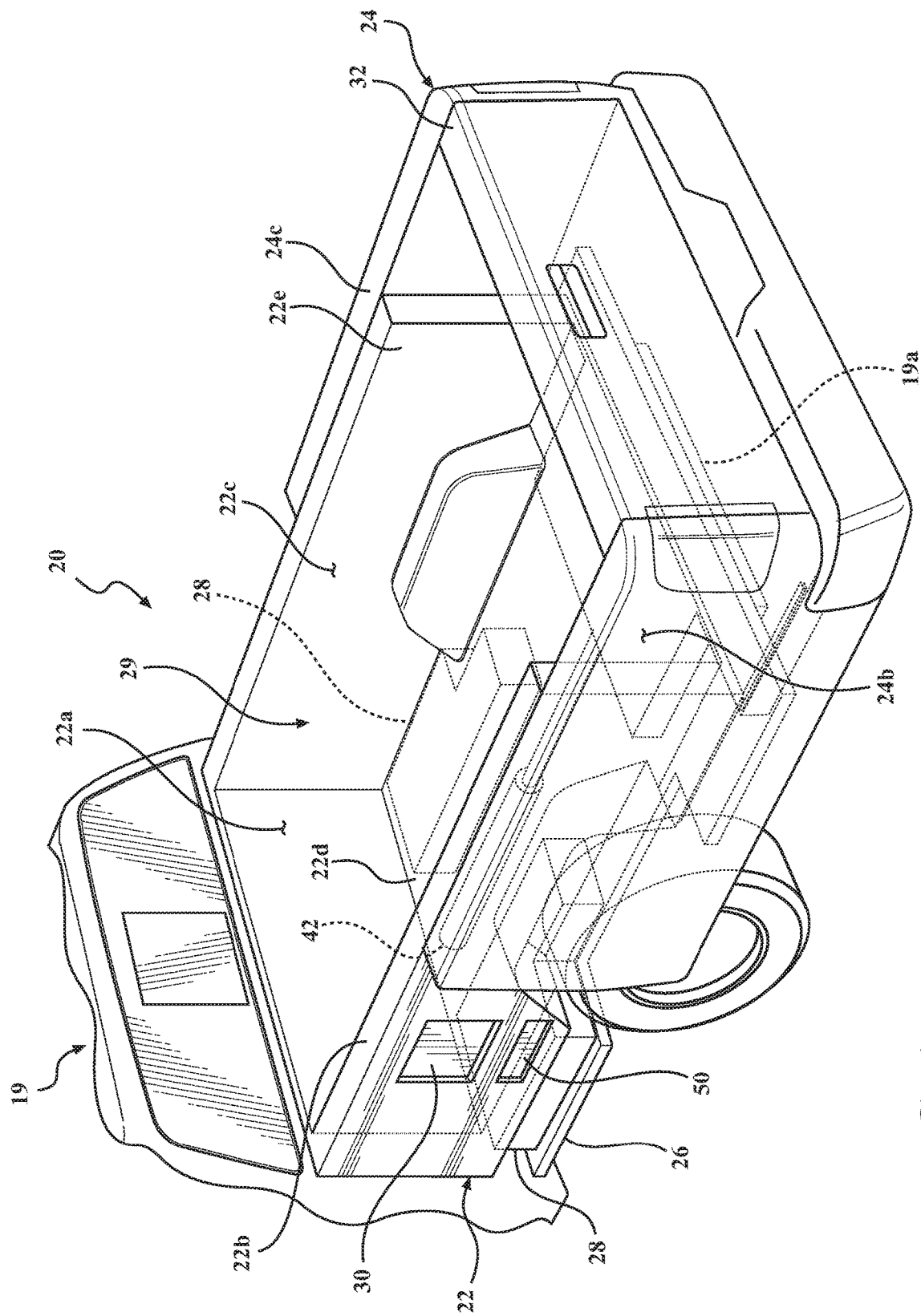
FIG. 1B is the schematic perspective view of FIG. 1A showing the rear shell of the system in an extended position.

FIG. 1A is a schematic perspective view of an expandable cargo bed system (generally designated 20) for a vehicle, in accordance with an embodiment described herein. The expandable cargo bed system 20 may include a front shell 22 and a rear shell 24 operably coupled to the front shell 22 so as to be movable with respect to the front shell 22 between a retracted position and an extended position, so as to vary a length of the cargo bed. FIG. 1A shows the rear shell 24 in a retracted position. FIG. 1B shows the rear shell 24 in an extended position to provide a longer cargo bed.

Referring to the drawings, a platform 26 may be provided on which elements of the cargo bed system 20 may be mounted. The platform 26 may be a portion of a frame 19a of the vehicle, or the platform may be an element separate from the vehicle frame 19a and which is secured to the frame and/or another portion of the vehicle. The platform 26 may be incorporated as part of the cargo bed system 20. The platform may have a first side 26a facing in a direction toward the cargo bed. In the embodiment shown in the drawings, the platform 26 rests atop the frame 19a and has an "H"-shape with cutouts for vehicle rear wheel wells.

One or more base elements 28 may be mounted to the platform 26 to support the front shell 22 (described in greater detail hereinafter) of the cargo bed system 20. The base element(s) 28 may be structured to elevate the front shell 22 above the platform 26, thereby enabling a portion of a rear shell 24 (also described hereinafter) to move between the platform 26 and a floor portion of the front shell 22 as the rear shell moves forwardly and rearwardly. The drawings show base elements 28 secured to the platform along each of the right and left sides of the vehicle. The base elements may be welded, bolted or otherwise suitably secured to the platform 26.

The front shell 22 may be statically mounted to the base element(s) 28. Front shell 22 may include a front wall 22a, a first sidewall 22b, a second sidewall 22c positioned opposite the first sidewall 22b, and a floor portion 22d extending between the first and second sidewalls 22b, 22c and the front wall 22a. A rear portion 22e of the front shell 22 is open (i.e., no rear wall extends between the first and second sidewalls 22b, 22c of the front shell 22). The front wall 22a may serve as a front wall of the vehicle cargo bed 29. The front shell 22 may incorporate rear wheel wells. The front shell 22 may be welded, bolted or otherwise suitably secured to the base elements 28.

At least one cargo bed access passage 30 may extend through the front shell first sidewall 22b between a first side 22b-1 of the front shell first sidewall 22b and a second side 22b-2 of the front shell first sidewall 22b opposite the first side 22b-1. The cargo bed access passage 30 may enable user access to the cargo bed 29 through the front shell first sidewall 22b. A door 22g may cover and/or seal the access passage 30 when the passage is not being used. In one or more arrangements, the front shell second sidewall 22c may also include one or access passages (not shown), associated doors and/or compartments as described herein.

Rear shell 24 may be operably coupled to the front shell 22 so as to be movable with respect to the front shell 22 between a retracted position (shown in FIGS. 1A and 3A) and an extended position (shown in FIGS. 1B and 3B) so as to vary a length of the cargo bed 29. The rear shell 24 may include a first sidewall 24b, a second sidewall 24c positioned opposite the rear shell first sidewall 24b, and a floor portion 24d extending between the rear shell first and second sidewalls 24b, 24c. In addition, the rear shell first sidewall 24b may be structured so as to cover the front shell first sidewall cargo bed access passage 30 when the rear shell 24 is in the retracted position. Also, the rear shell first sidewall 24b may be structured such that the front shell first sidewall cargo bed access passage 30 is exposed or not covered by the rear shell first sidewall 24b when the rear shell 24 is in the extended position. This arrangement prevents access to the front shell first sidewall cargo bed access passage 30 when the rear shell 24 is in the retracted position, and enables access to the front shell first sidewall cargo bed access passage 30 when the rear shell 24 is in the extended position.

The rear shell second sidewall 24c may reside adjacent the front shell second sidewall 22c and may be structured to block or enable access to a cargo bed access passage (not shown) formed in the front shell second sidewall 22c, in a manner similar to that described with regard to the front shell first sidewall 22b and the rear shell first sidewall 24b. A conventional tailgate 32 may be rotatably mounted to the rear shell 24 so as to extend between the rear shell first and second sidewalls 24b, 24c and opposite the front shell front wall 22a.

As seen in the drawings, the rear shell first sidewall 24b may reside exterior of the front shell first sidewall 22b (i.e., all portions of the rear shell first sidewall 24b reside farther from a vertical plane F1 extending along a fore-aft axis of the vehicle than all portions of the front shell first sidewall 22b). Also, the rear shell second sidewall 24c may reside exterior of the front shell second sidewall 22c (i.e., all portions of the rear shell second sidewall 24c reside farther from a fore-aft axis F1 of the vehicle than all portions of the front shell second sidewall 22c).

A length of the cargo bed 29 may be equal to a combined length of the front shell floor portion 22d and a part of the rear shell floor portion 24d extending between the front shell floor portion 22d and the tailgate 32, in a direction extending parallel to a fore-aft axis of the vehicle (i.e., a direction extending from the front toward the rear of the vehicle). Thus, the cargo bed length may extend along the floor portions of the cargo bed from an interior surface of the front shell front wall 22a to an interior surface of the tailgate 32.

As seen in the drawings, a rear end portion of the front shell 22 may be structured to be received in a front end portion of the rear shell 24. The rear shell floor portion 24d may reside close to the front shell floor portion 22d and may slide with respect to the front shell floor portion 22d as the rear shell 24 moves with respect to the front shell 22, thereby reducing or increasing the length of the cargo bed 29. A front part of the rear shell 24 may move back and forth below the rear portion of the front shell 22.

Figure 2:
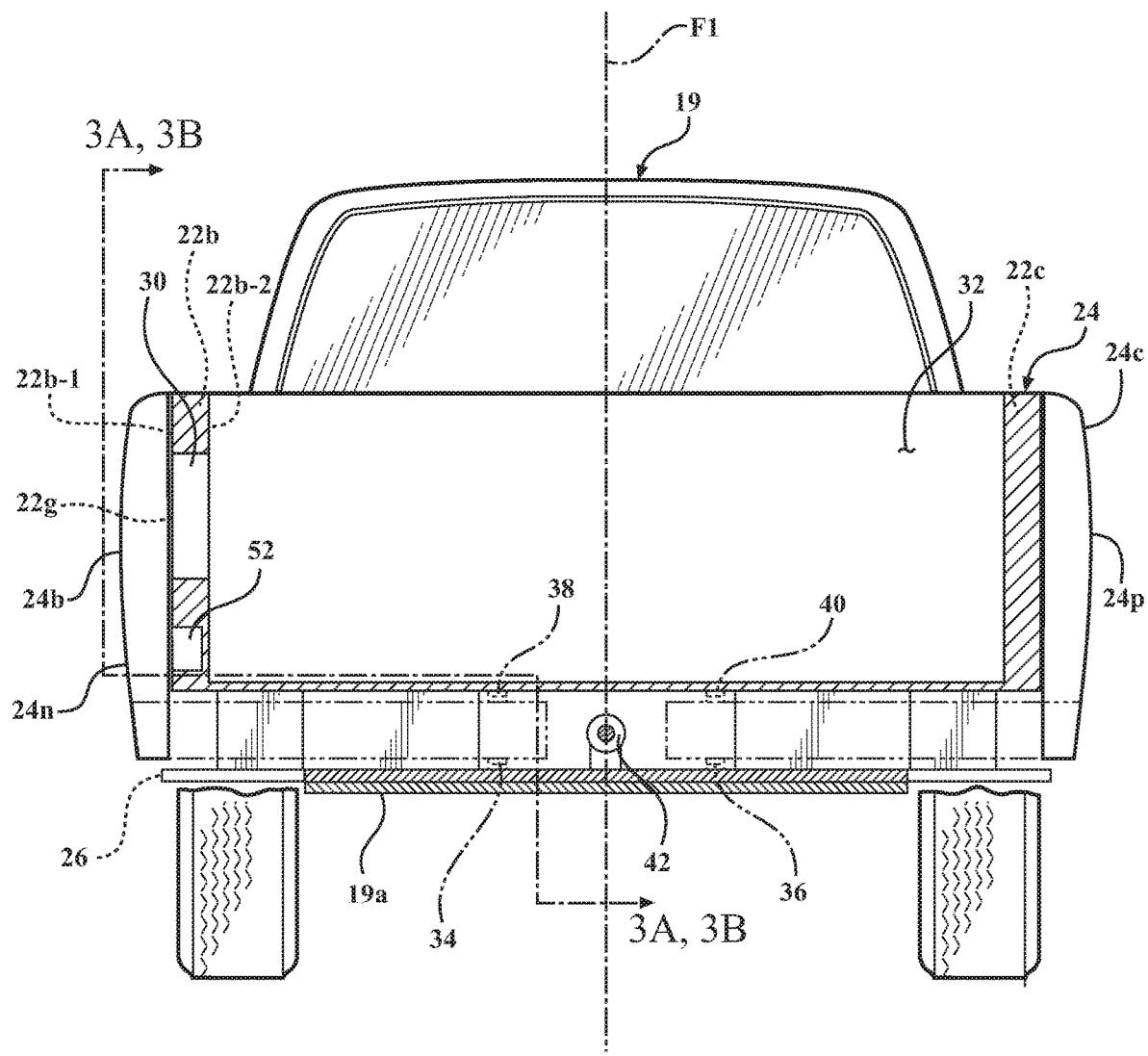
FIG. 2 is a schematic rear partial cross-sectional view of the expandable cargo bed system shown in FIG. 1.

In one or more arrangements, a lowermost surface 24m of the rear shell 24 facing the platform 26 along a first side 24n (FIG. 2) of the rear shell 24 may be rollable along first bearings 34 (such as linear motion bearings) mounted along the first side 26a of the platform residing opposite the rear shell lowermost surface 24m along the platform first side 26a. Similarly, the lowermost surface 24m of the rear shell 24 facing the platform 26 along a second side 24p of the rear shell opposite the first side 24n may be rollable along second bearings 36 mounted along a surface of the platform 26 residing opposite the rear shell lowermost surface 24m along the second side 24p of the rear shell.

Also, additional bearings 38 may be mounted to an lower surface of the floor portion 22d of the front shell 22 residing above the floor portion 22d of the rear shell, to enable the rear shell floor portion 24d to roll along an underside of the front shell floor portion 22d along the lower surface of the front shell floor portion 22d. Similarly, bearings 40 may be mounted to an lower surface of the floor portion 22d of the front shell 22 residing above the floor portion 24d of the rear shell 24, to enable the rear shell floor portion 24d to roll along an underside of the front shell floor portion 22d along the second side 24p of the rear shell 24. Additional bearings (not shown) may be mounted to inner surfaces of rear shell sidewall(s) 24b, 24c and/or exterior surfaces of front shell sidewall(s) if desired, to further enhance support of the rear shell. By this arrangement, the rear shell 24 may be rollably supported between the bearings 34, 36 mounted on the platform and the bearings 38, 40 mounted on the underside of the front shell floor portion 22d.

One or more actuator(s) 42 may be mounted to the platform 26 and/or to the base elements 28. Actuator(s) 42 may be operably coupled to the rear shell 24 for moving the rear shell forwardly (i.e., in a first direction D1 toward the front shell front wall portion 22a) and rearwardly (in a second direction D2 opposite the first direction D1) responsive to a command from a user. Thus, the actuator(s) 42 may move the rear shell 24 between the retracted position and the extended position.

The embodiment shown in the drawings includes a single actuator 42. In one or more arrangements, the actuator 42 may be in the form of a pneumatic or hydraulic cylinder mounted to the platform between the base elements 28. The embodiment shown in the drawings incorporates a single cylinder mounted on a central portion of the platform 26. A shaft of the cylinder 42 may be coupled to a front portion of the rear shell floor 24d. A length and mounting position of the cylinder may be adjusted according to the dimensions of pertinent portions of the front and rear shells and other pertinent parameters to provide the actuation stroke needed to move the rear shell 24 to a position where the cargo bed access passage(s) and/or compartments described herein may be accessible and usable by a user. The actuator(s) 42 may be controlled by any suitable control mechanism, for example, a key fob or a push button or keypad control (not shown) located in a cab or occupant compartment of the vehicle.

In one or more arrangements, the front shell first sidewall 22b may include at least one access opening 50 to least one associated front shell first sidewall interior compartment 52. In addition, the rear shell first sidewall 24b may be structured so as to cover the first sidewall interior compartment opening(s) 50 when the rear shell 24 is in the retracted position. The rear shell first sidewall 24b may also be structured so such that the first sidewall interior compartment opening(s) are exposed or not covered when the rear shell 24 is in the extended position. The first sidewall interior compartment(s) may be positioned between the first side 22b-1 of the front shell first sidewall 22b and the second side 22b-2 of the front shell First sidewall 22b. Thus, the first sidewall wall interior compartment(s) 52 may be structured to store items within the structure of the front shell first sidewall 22b rather than inside the cargo bed 29.

Figure 3A:
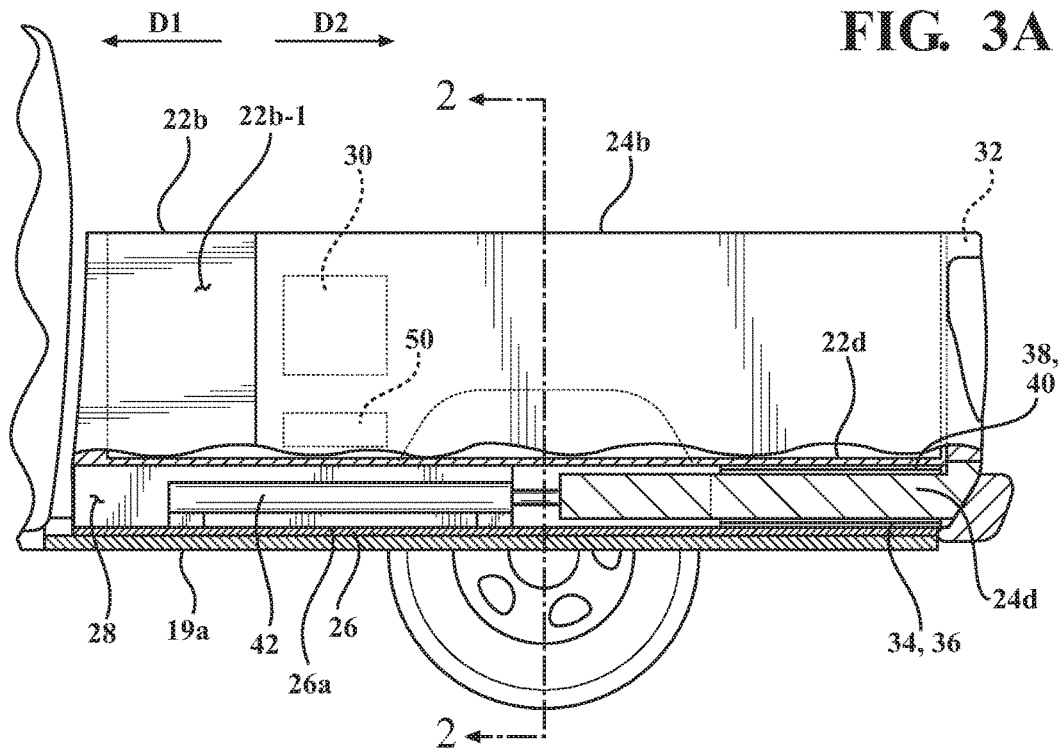
FIG. 3A is a schematic partial cross-sectional side view of the expandable cargo bed system shown in FIG. 1, again showing the rear shell in the retracted position.
Figure 3B:
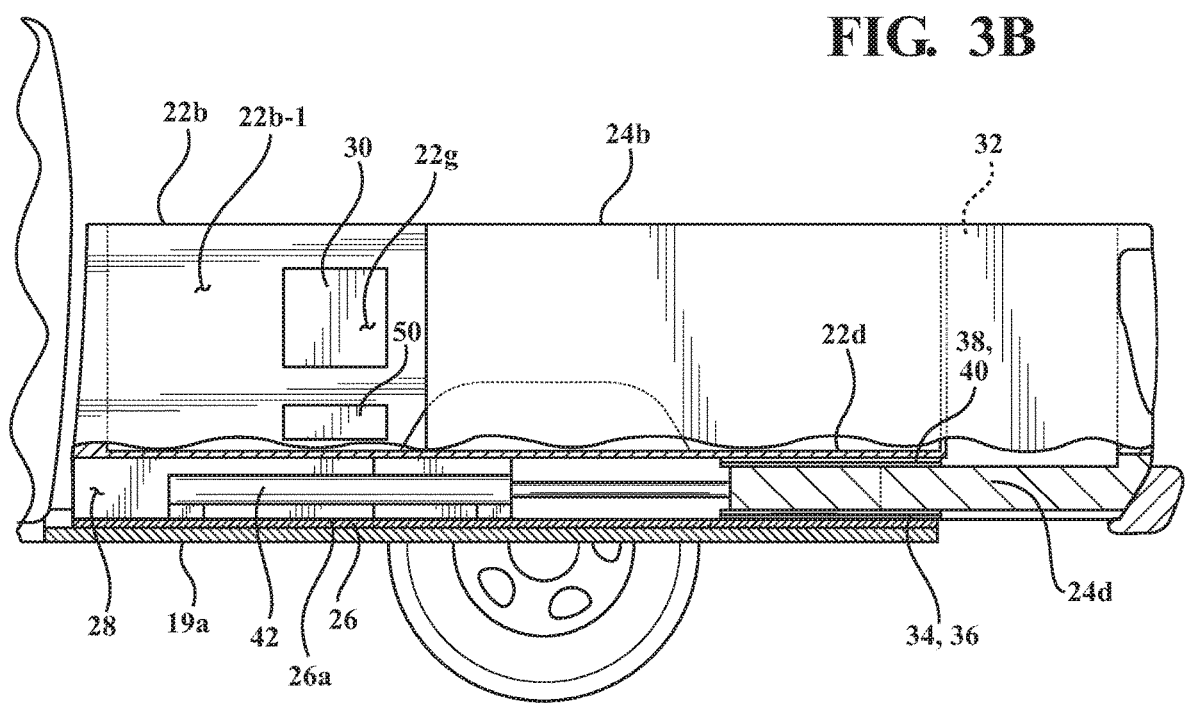
FIG. 3B is the schematic partial cross-sectional side view of FIG. 3A showing the rear shell in the extended position.

In one or more arrangements, a first sidewall wall interior compartment 52 may be located below a cargo bed access passage 30, as shown in FIGS. 3A and 3B. This may give a user the option of reaching into the cargo bed 29 at a relatively higher level or reaching downwardly to a relatively lower level in the cargo bed through the access passage 30. In other arrangements, a first sidewall wall interior compartment 52 may be located above the cargo bed access passage 30.

To access the first sidewall wall interior compartment 52 and/or the cargo bed access passage 30, a user may operate the actuator(s) 42 so as to move the rear shell 24 rearwardly, thereby exposing openings to the first sidewall wall interior compartment 52 and/or the cargo bed access passage 30.

Figure 4A:
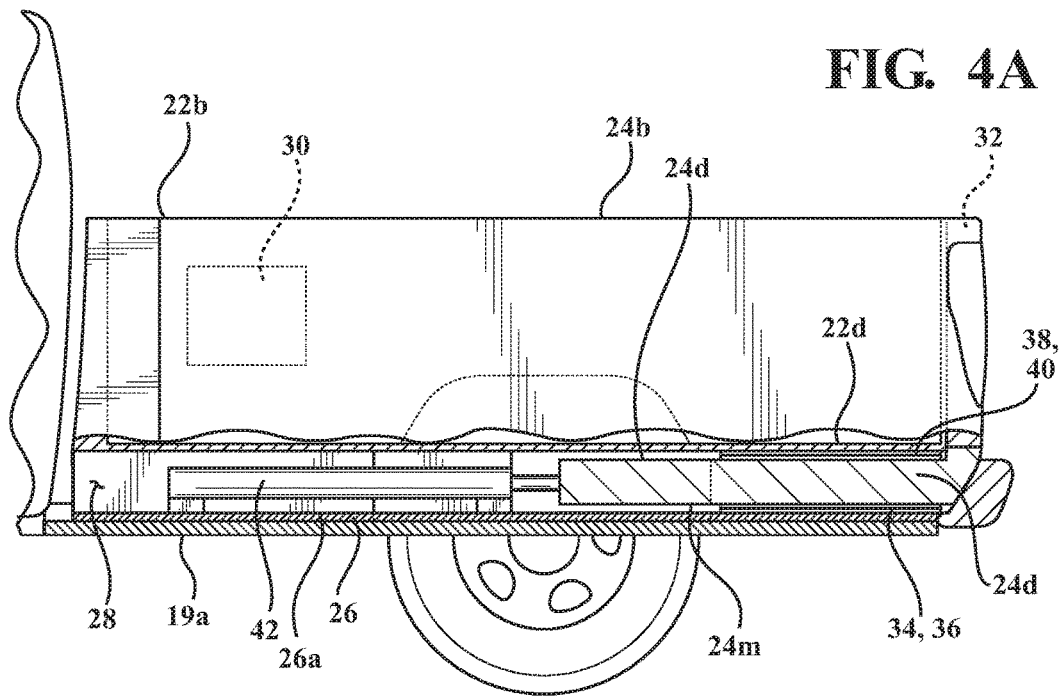
FIG. 4A is a schematic partial cross-sectional side view similar to the view of FIG. 3A showing an alternative embodiment of the expandable cargo bed system with the rear shell of the system in a retracted position.
Figure 4B:
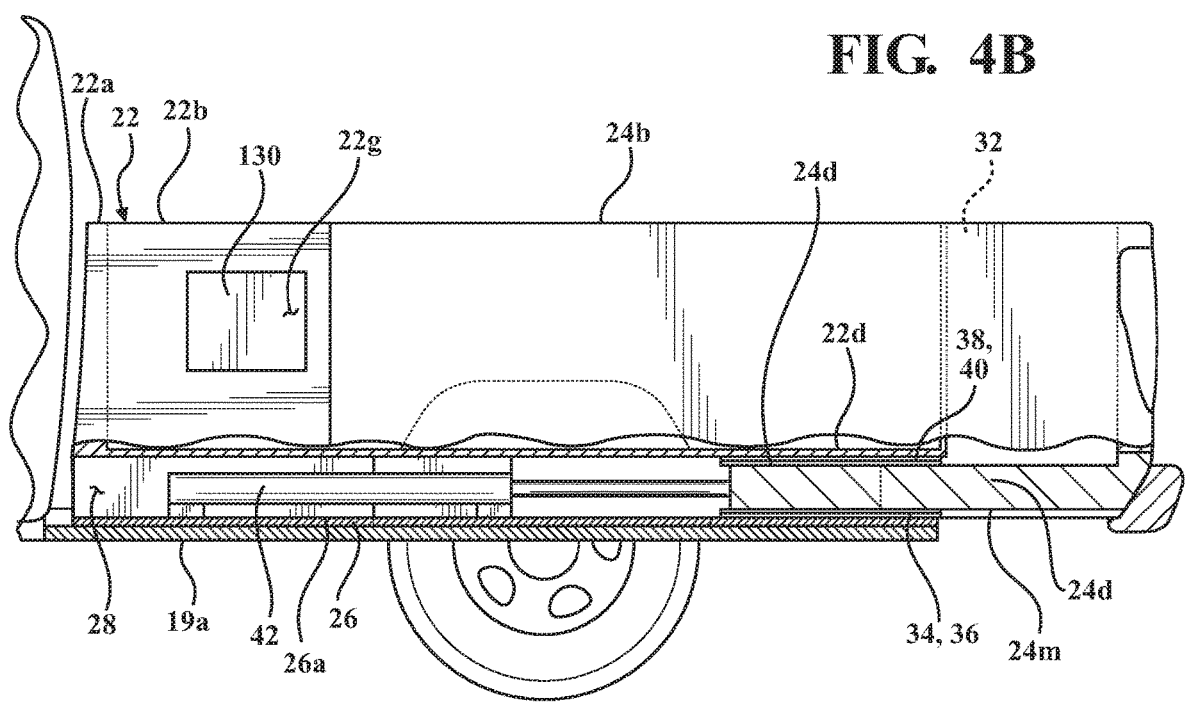
FIG. 4B is the schematic partial cross-sectional side view of FIG. 4A showing the rear shell in the extended position.

Referring to FIGS. 4A and 4B, in one or more arrangements, a cargo bed access passage 130 may be formed in the front shell first sidewall 22b adjacent the front wall 22a of the front shell 22, thereby providing user access to a front portion of the cargo bed 29. In addition, the rear shell first sidewall 24b may be lengthened or extended forwardly to cover the forward cargo bed access passage 130 in the manner previously described, when the rear shell 24 is in a retracted position. The rear shell 24 may also be structured to be movable rearwardly by actuator(s) 42 to an extended position as previously described, to expose the forward cargo bed access passage 130.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An expandable cargo bed system for a vehicle, the system comprising:
   a front shell including a front shell first sidewall, the front shell first sidewall including at least one cargo bed access passage extending between a first side of the front shell first sidewall and a second side of the front shell first sidewall opposite the first side, and at least one access opening to at least one associated front shell first sidewall wall interior compartment; and
   a rear shell operably coupled to the front shell so as to be movable with respect to the front shell between a retracted position and an extended position so as to vary a length of a cargo bed of the cargo bed system, the rear shell having a rear shell first sidewall,
   wherein the rear shell first sidewall is structured to cover the at least one cargo bed access passage when the rear shell is in the retracted position, and structured so that the at least one cargo bed access passage is not covered by the rear shell first sidewall when the rear shell is in the extended position, and wherein an uppermost edge of the at least one access opening is positioned below a lowermost edge of the at least one cargo bed access passage.

2. The expandable cargo bed system of claim 1 wherein the rear shell first sidewall resides exterior of the front shell first sidewall.

3. The expandable cargo bed system of claim 1 wherein the rear shell first sidewall is structured to cover the at least one front shell first sidewall interior compartment opening when the rear shell is in the retracted position, and wherein the rear shell first sidewall is structured so that the at least one front shell first sidewall interior compartment opening is not covered by the rear shell first sidewall when the rear shell is in the extended position.

4. A vehicle including an expandable cargo bed system in accordance with claim 1.

* * * * *